United States Patent
Wright

(10) Patent No.: US 7,357,849 B2
(45) Date of Patent: Apr. 15, 2008

(54) METHOD AND SYSTEM FOR SEPARATING SOLIDS FROM LIQUIDS

(75) Inventor: Robert R. Wright, Big Canoe, GA (US)

(73) Assignee: Watervap, LLC, Marble Hill, GA (US)

( * ) Notice: Subject to any disclaimer, the term of this patent is extended or adjusted under 35 U.S.C. 154(b) by 0 days.

(21) Appl. No.: 11/372,316

(22) Filed: Mar. 9, 2006

(65) Prior Publication Data

US 2007/0045100 A1 Mar. 1, 2007

Related U.S. Application Data

(63) Continuation-in-part of application No. 11/283,438, filed on Nov. 18, 2005, now abandoned, which is a continuation-in-part of application No. 11/217,135, filed on Sep. 1, 2005, now abandoned.

(51) Int. Cl.
*B01D 1/18* (2006.01)
*B01D 3/02* (2006.01)
*C02F 1/04* (2006.01)

(52) U.S. Cl. .................. 203/10; 159/4.2; 159/48.2; 159/16.1; 202/155; 202/172; 202/182; 202/176; 202/200; 203/47; 203/49; 203/71; 203/100

(58) Field of Classification Search .............. 202/200, 202/236, 155, 172, 182, 176; 203/10, 47, 203/49, 71, 100, 90; 159/48.1, 48.2, 16.1, 159/4.2; 210/664, 512.1, 665, 499

See application file for complete search history.

(56) References Cited

U.S. PATENT DOCUMENTS

| | | | |
|---|---|---|---|
| 1,546,922 A | 7/1925 | Faber | |
| 1,798,166 A * | 3/1931 | Mensing | 568/735 |
| 2,921,004 A * | 1/1960 | Wood | 202/177 |
| 2,971,897 A * | 2/1961 | Chapman | 202/174 |
| 3,147,598 A | 9/1964 | Wilson | |
| 3,520,066 A | 7/1970 | Meade | |
| 3,522,151 A * | 7/1970 | Dismore | 202/236 |
| 3,595,297 A | 7/1971 | Berg | |
| 3,704,169 A | 11/1972 | Woodruff et al. | |
| 3,743,483 A | 7/1973 | Shah | |
| 3,799,235 A | 3/1974 | Moosavian et al. | |
| 3,857,704 A * | 12/1974 | Coulter | 75/721 |
| 3,895,994 A | 7/1975 | Saguchi et al. | |
| 3,933,600 A | 1/1976 | Dodge et al. | |
| 4,052,255 A | 10/1977 | Hackbarth et al. | |
| 4,233,114 A | 11/1980 | Gastaldi | |

(Continued)

*Primary Examiner*—Virginia Manoharan
(74) *Attorney, Agent, or Firm*—Preti Flaherty Beliveau & Pachios LLP

(57) ABSTRACT

A method and system for treating feedwater includes evaporating a portion of the feedwater in a first evaporation chamber so as to separate water vapor from the remaining feedwater. Droplets of the remaining feedwater are dispersed into a stream of hot air produced in a second evaporation chamber. The droplets evaporate and solids in the feedwater precipitate. The precipitated solids are collected in the lower section of the second evaporation chamber. Water vapor discharged from both evaporation chambers can be treated in a cyclone separator to remove residual solids therefrom. The cleansed water vapor output from the cyclone separator can be condensed to recover clean water. Dry solids can be discharged from the second evaporation chamber and the cyclone separator for recovery.

17 Claims, 2 Drawing Sheets

U.S. PATENT DOCUMENTS

| | | | |
|---|---|---|---|
| 4,239,588 A * | 12/1980 | Engelhardt | 159/48.1 |
| 4,263,234 A * | 4/1981 | Prudhon et al. | 261/153 |
| 4,279,693 A * | 7/1981 | Kuhnlein et al. | 588/321 |
| 4,323,424 A | 4/1982 | Secunda et al. | |
| 4,376,010 A | 3/1983 | Gauvin | |
| 4,581,829 A * | 4/1986 | Becker et al. | 34/402 |
| 4,671,949 A * | 6/1987 | Bourgeois et al. | 423/315 |
| 4,784,878 A | 11/1988 | Haak | |
| 4,793,937 A * | 12/1988 | Meenan et al. | 210/771 |
| 4,963,226 A | 10/1990 | Chamberlain | |
| 5,015,332 A | 5/1991 | Iwaya et al. | |
| 5,096,537 A | 3/1992 | Bergquist et al. | |
| 5,360,511 A | 11/1994 | Bayliss et al. | |
| 5,431,780 A | 7/1995 | Raehse et al. | |
| 5,480,539 A | 1/1996 | Schneider | |
| 5,743,080 A | 4/1998 | Ginter | |
| 6,200,428 B1 | 3/2001 | VanKouwenberg | |
| 6,299,735 B1 | 10/2001 | Lumbreras | |
| 6,364,996 B1 | 4/2002 | Martinez Barrado | |
| 6,500,216 B1 | 12/2002 | Takayasu | |
| 6,685,802 B1 | 2/2004 | Nazzer | |
| 6,699,369 B1 | 3/2004 | Hartman et al. | |
| 6,820,865 B2 | 11/2004 | Low | |

\* cited by examiner

METHOD AND SYSTEM FOR SEPARATING SOLIDS FROM LIQUIDS

CROSS REFERENCES TO RELATED APPLICATIONS

This application is a Continuation-In-Part of U.S. patent application Ser. No. 11/283,438, entitled "METHOD AND SYSTEM FOR SEPARATING SOLIDS FROM LIQUIDS" and filed Nov. 18, 2005, now abandoned, which is a Continuation-In-Part of U.S. patent application Ser. No. 11/217,135, entitled "METHOD AND SYSTEM FOR SEAPARATING SOLIDS FROM LIQUIDS" and filed Sep. 1, 2005, now abandoned.

BACKGROUND OF THE INVENTION

This invention relates generally to systems and methods for treating liquids carrying suspended or dissolved solids and more particularly to separating the solids from the liquid in order to recover dry solids and/or reusable or potable water.

Membrane treatment processes such as reverse osmosis and thermal treatment processes such as multi-stage distillation are commonly used throughout the world for reducing dissolved salts in a water supply source such as seawater in order to produce potable water. Industrial wastewater is also commonly treated with these processes prior to disposal. The two aforementioned processes become increasingly less efficient as the dissolved salt concentration in the water to be treated becomes higher. In the case of seawater, the recovery efficiency of the two processes typically ranges between 35 to 50 percent. As one example, at a 50 percent recovery capability, only 50 gallons of purified water can be recovered out of every 100 gallons of raw saltwater treated. This particular feature associated with current desalination technologies has become an increasing environmentally related problem because of the need to dispose of the concentrate, i.e., the portion of the process water that remains after producing the distilled or product water. The disposal of this concentrate is capable of causing extreme environmental damage to the aquatic life in the receiving body of water.

The dissolved salt concentration in water can be a limiting factor as to the ability of membrane or thermal distillation processes to treat the water. These two types of processes have demonstrated their ability to feasibly treat seawater having dissolved salt concentrations not much greater than 40,000 mg/l. There are numerous industrially produced wastewaters that have dissolved salt concentrations exceeding this level. Furthermore, reverse osmosis processes require electrical energy, and the electrical energy requirement generally becomes greater as the salinity of the water to be treated increases. Thus, the energy cost of reverse osmosis desalination processes is greater for high salinity liquids.

The use of reverse osmosis membrane technology for the treatment of brackish water, seawater supply sources, and industrial wastewaters continues to grow rapidly. Despite the advances made in improving the membranes, they are still subject to biological and chemical fouling as well as a requirement of periodic cleaning and replacement.

Accordingly, there is a need for a system and method capable of economically treating saltwater and wastewater having unacceptable levels of dissolved salt concentrations to recover dry solids and/or reusable water. It is also desirable to be able to treat feedwater having extremely high salt concentration, such as industrial waters associated with the meat processing industry, oil well production water, and concentrate from reverse osmosis plants.

SUMMARY OF THE INVENTION

The above-mentioned need is met by the present invention, which provides a method for treating feedwater that includes evaporating a portion of the feedwater in a first evaporation chamber so as to separate water vapor from the remaining feedwater. The method further includes producing a stream of hot air in a second evaporation chamber having an upper section and a lower section and dispersing droplets of feedwater discharged from the first evaporation chamber into the stream of hot air. The droplets evaporate and solids in the feedwater precipitate. The precipitated solids are collected in the lower section of the second evaporation chamber. Water vapor discharged from both evaporation chambers can be treated in a cyclone separator to remove residual solids therefrom. The cleansed water vapor output from the cyclone separator can be condensed to recover clean water. Dry solids can be discharged from the second evaporation chamber and the cyclone separator for recovery.

In one embodiment, a system for treating feedwater includes first and second evaporation chambers. The first evaporation chamber has an interior region and a means for heating the interior region such that feedwater introduced therein will be partially evaporated. The second evaporation chamber has an upper section and a lower section and a means for producing a stream of hot air therein. At least one atomizer is disposed in the upper section of the second evaporation chamber so as to disperse droplets of feedwater discharged from the first evaporation chamber into the stream of hot air. These droplets evaporate and solids from the feedwater precipitate and fall by gravity into the lower section. The system can also includes a cyclone separator connected to receive water vapor output from both evaporation chambers and a condenser for condensing water vapor output from the cyclone separator.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
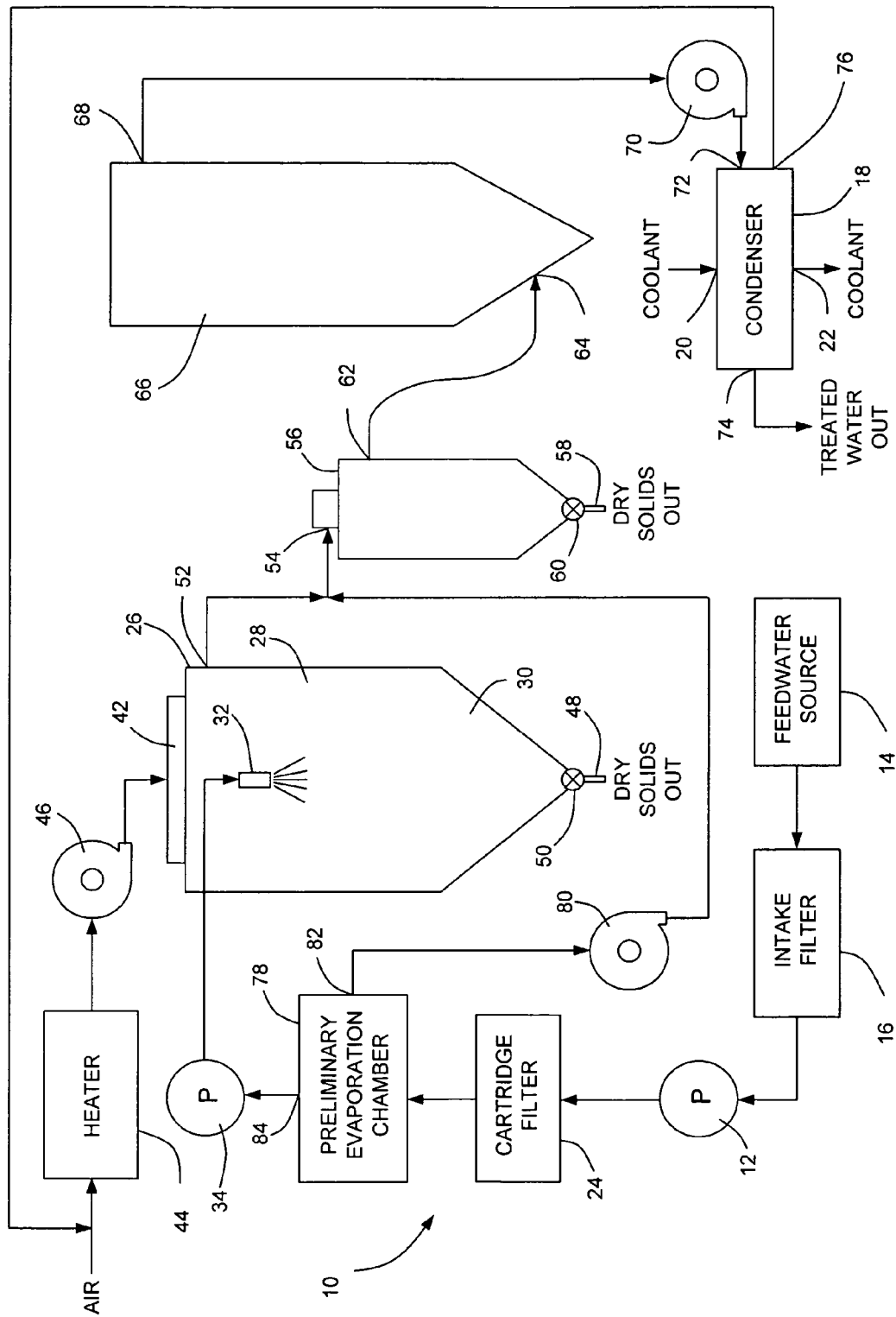
FIG. 1 is a schematic view of a system for treating liquids carrying suspended or dissolved solids by separating the solids from the liquid.

Referring to the drawings wherein identical reference numerals denote the same elements throughout the various views, FIG. 1 shows a system 10 for treating liquids carrying suspended or dissolved solids by separating the solids from the liquid. The system 10 is mostly applicable to treating aqueous solutions and/or suspensions, but can also be used for treating liquids other than water-based mixtures. The system 10 is particularly useful in desalinizing seawater by removing salt to provide potable water. Other treatable liquids include reverse osmosis concentrate and industrial wastewater. For purposes of convenience, the liquid being treated by system 10 is referred to herein as the "feedwater," which is intended to include any type of liquid carrying suspended or dissolved solids.

The system 10 includes a supply pump 12 that pumps raw feedwater from a source 14 through an intake filter 16. The intake filter 16, which is preferably connected to the suction pipe of the supply pump 12, filters the feedwater to remove any large particles that may be suspended in the feedwater. Removing large particles from the feedwater prior to injection into atomizers (described below) prevents clogging of small diameter orifices. In one embodiment, the intake filter 16 can be a corrosion resistant plastic screen having screen openings varying between 20 to 100 microns.

The discharge pipe of the supply pump 12 is connected to a pressure cartridge filter 24 for further filtering of the feedwater. The cartridge filter 24 can have openings as small as 1 micron, but openings in the range of 10-20 microns are typically sufficient. Depending on the orifice size of the atomizers utilized in the system 10, the cartridge filter 24 can be omitted, and the intake filter 16 would be the only pre-filtering device used.

The system 10 further includes a preliminary or first-stage evaporation chamber 78 connected to the cartridge filter 24 (or to the discharge pipe of the supply pump 12 if the cartridge filter 24 is omitted). Filtered feedwater from the cartridge filter 24 enters the first-stage evaporation chamber 78 and undergoes a partial vaporization. That is, some but not all, of the feedwater is vaporized in the first-stage evaporation chamber 78. Thus, a portion of the total volume of feedwater entering the first-stage evaporation chamber 78 is transformed into water vapor, while the rest of the total volume of feedwater entering the first-stage evaporation chamber 78 remains in liquid form. The water vapor is substantially free of the solids that are dissolved or suspended in the feedwater because the solids become separated from the vapor phase of the water during evaporation. All or very nearly all of the solids are retained in the portion of the feedwater that is not vaporized. Accordingly, this remaining feedwater has a higher concentration of solids (i.e., higher salinity) than the feedwater entering the first-stage evaporation chamber 78. An exhaust fan 80 removes the water vapor from the first-stage evaporation chamber 78 via a first outlet 82 and directs this water vapor to another section of the system 10, described below. The high concentration feedwater exits the first-stage evaporation chamber 78 via a second outlet 84.

Figure 2:
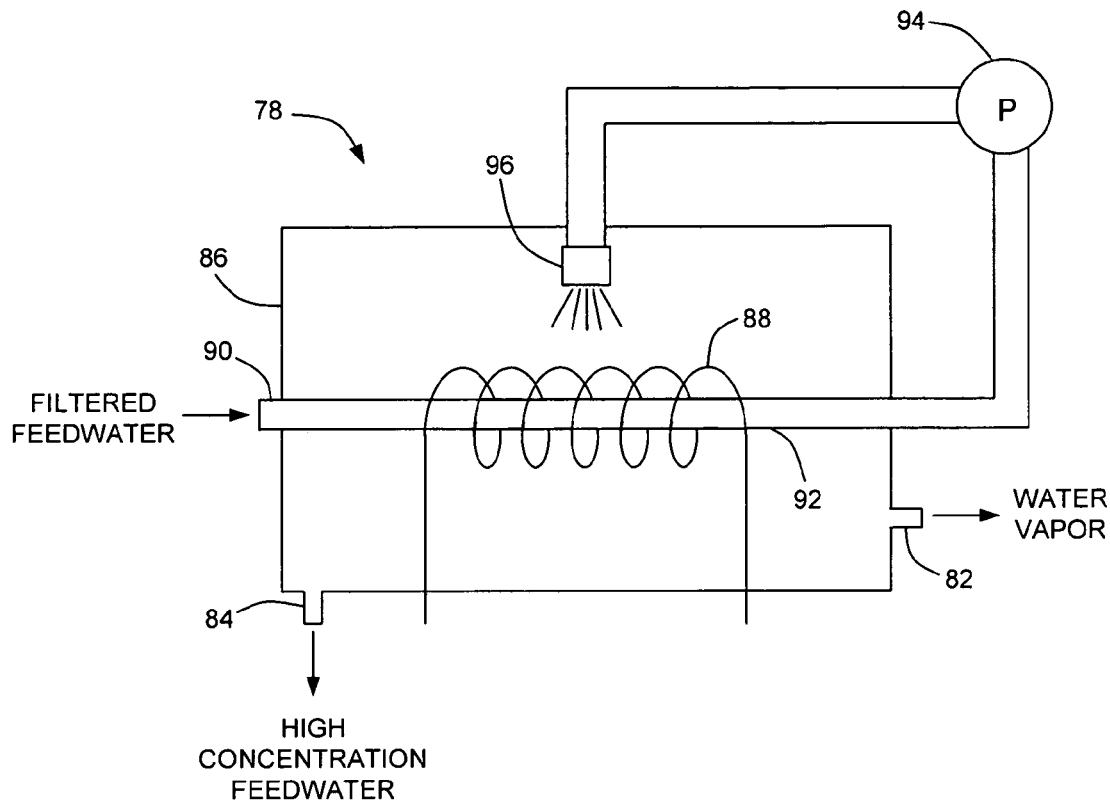
FIG. 2 is a schematic view of a preliminary or first-stage evaporation chamber that can be used in the system of FIG. 1.

FIG. 2 shows one possible embodiment of a first-stage evaporation chamber. This first-stage evaporation chamber 78 comprises a closed vessel 86 defining an interior region and a heating coil 88 disposed inside the vessel 86 for heating the interior region. Filtered feedwater from the cartridge filter 24 enters the vessel 86 through an inlet 90 and flows through a conduit 92 that passes in close proximity to the heating coil 88 so that the feedwater is heated. The heated feedwater is pumped by a recirculation pump 94 to a nozzle system 96 (comprising one or more spray nozzles) that sprays the feedwater over the heating coil 88. (Alternatively, filtered feedwater from the cartridge filter 24 can be supplied directly to the nozzle system 96 without a recirculation pass through the vessel 86.) The feedwater is heated to a temperature sufficient to achieve the partial vaporization described above. This temperature will typically be in the range of about 150-200° F., and will preferably not exceed 180° F. The resulting water vapor is removed through the first outlet 82, and the concentrated feedwater is removed through the second outlet 84.

Referring again to FIG. 1, the system 10 further includes a main or second-stage evaporation chamber 26. The second-stage evaporation chamber 26 comprises a vertically oriented vessel having a cylindrical upper section 28 and a conical lower section 30. One or more devices for atomizing feedwater, referred to herein as atomizers 32 (only one shown in FIG. 1), are located near the top of the second-stage evaporation chamber 26 in the upper section 28. The atomizers 32 are connected to the discharge pipe of a feed pump 34, and the suction pipe of the feed pump 34 is connected to the second outlet 84 of the first-stage evaporation chamber 78. High concentration feedwater is thus pumped under pressure to the atomizers 32 inside the second-stage evaporation chamber 26. The feed pressure will depend on the type of atomizers utilized and will generally range from about 50 to 1200 psi. It should be noted that in some applications both the supply pump 12 and the feed pump 34 will not be needed; in many cases a single pump will provide sufficient pressure. In instances where the feedwater line pressure is adequate, no pump will be needed.

Figure 3:
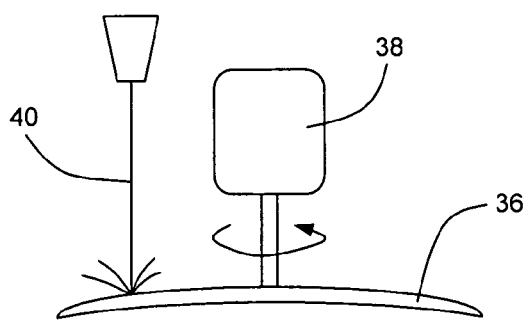
FIG. 3 is a schematic view of a spinning disc-type atomizer.

The atomizers 32 can comprise various devices such as non-pneumatic spray nozzles, pneumatic spray nozzles or high-speed spinning wheels or discs. In a non-pneumatic spray nozzle, feedwater is atomized by being forced through a relatively small diameter orifice under the pressure of the feed pump 34 (or the line pressure where the feed pump is not used). In a pneumatic spray nozzle, feedwater is forced through a relatively small diameter orifice with a jet of compressed air that is also supplied to the nozzle. Referring to FIG. 3, a spinning disc-type atomizer includes a spinning disc 36 that is driven at high speeds by a motor 38. A stream of feedwater 40 is directed to impinge on the spinning disc 36. As the feedwater impinges on the spinning disc 36, it undergoes shear forces that atomize the feedwater into a fog or mist of fine droplets.

The choice of atomizer is dependent on the flow rate and characteristics of the feedwater to be treated. For example, pneumatic spray nozzles are generally more applicable for low flow rates, while non-pneumatic spray nozzles are generally more applicable for higher flow rates. It is principally an economic decision as to which type is used based on energy considerations associated with air compressor horsepower (for pneumatic spray nozzles) and higher hydraulic feed pressure which requires higher horsepower pumps (for non-pneumatic spray nozzles). A spinning disc-type atomizer, which does not utilize a small diameter orifice, is less susceptible to clogging. These atomizers therefore can be more applicable for treating feedwater having suspended particles that would easily clog or plug spray nozzles. The use of a spinning disc-type atomizer would require less stringent pre-filtration and consequently be less costly.

Referring again to FIG. 1, an inlet 42, such as a manifold, is provided on top of the second-stage evaporation chamber 26 for introducing a downward flowing stream of hot air into the second-stage evaporation chamber 26. The heated air is produced by a heater 44, which heats ambient air to a desired temperature. Heated air from the heater 44 is blown through the hot air inlet 42 by an inlet fan 46. The heater 44 can be a burner that generates hot air by burning any suitable fuel including, but not limited to, propane, natural gas, oil, methane, and biomass. Alternatively, the heater 44 can be a heat exchanger that heats incoming air with a heat source such as steam or waste heat (e.g., exhaust from an industrial process). Other energy sources such as solar or nuclear energy are also possible. The air should be heated to a temperature sufficient to achieve rapid, full vaporization of the high concentration feedwater and will typically have a temperature value in the range of about 225-1,000° F.

In operation, high concentration feedwater is pumped to the atomizers 32 which disperse the feedwater in the form of a fog or mist of fine droplets into the stream of hot air. The liquid portion of the droplets undergoes rapid evaporation in the second-stage evaporation chamber 26, resulting in the separation of solids (that were formerly dissolved or suspended in the droplets) from the vapor phase of the water. Larger precipitated solid particles settle by gravity to the conical lower section 30 of the second-stage evaporation chamber 26. The dry solids thus collected in the lower section 30 can be discharged from the second-stage evaporation chamber 26 through a first solids outlet 48 located at the bottom of the lower section 30. A valve 50 is provided for opening and closing the first solids outlet 48. In one embodiment, the valve 50 can be operated on a timer for periodically opening the first solids outlet 48 to dump dry solids into an appropriate collection container or conveyor (not shown). The collected dry solids can thus be an output product of the system 10. The water vapor and any smaller solid particles still entrained in the water vapor exit the second-stage evaporation chamber 26 through a vapor outlet 52 located near the top of the second-stage evaporation chamber 26. The cylindrical shape and vertical orientation of the second-stage evaporation chamber 26 provide uniform disbursement of the sprayed feedwater as well as effective utilization of the entire chamber volume. The vertical arrangement with the atomizers 32 located near the top of the second-stage evaporation chamber 26 enhances the ability to rely on gravity for the settling and collection of the larger precipitated solid particles.

The vapor outlet 52 of the second-stage evaporation chamber 26 is connected via a suitable conduit to the inlet 54 of a conventional cyclone separator 56. The inlet 54 is also connected to the output of the exhaust fan 80. Thus, water vapor discharged from the first evaporation chamber 78 and water vapor discharged from the second evaporation chamber 26 are combined and introduced into the cyclone separator 56. The cyclone separator 56 separates additional solids from the water vapor and discharges these dry solids through a second solids outlet 58 located at the bottom of the cyclone separator 56. As with the first solids outlet 48, the second solids outlet 58 is provided with a valve 60 that can be opened to dump dry solids from the cyclone separator 56. These dry solids can be combined with the dry solids discharged from the second-stage evaporation chamber 26. The water vapor and any residual solid particles entrained in the water vapor exit the cyclone separator 56 through a vapor outlet 62.

The vapor outlet 62 of the cyclone separator 56 is connected to the inlet 64 of a conventional bag filter 66, which removes the residual solids from the water vapor. Cleansed water vapor is drawn from the bag filter 66 through a vapor outlet 68 by an exhaust fan 70. The bag filter 66 can be omitted for some applications depending on the physical characteristics of the dry solids, the removal efficiency of the cyclone separator 56, and applicable air and/or water emission standards.

The system 10 further includes a condenser 18 having a coolant flowing in through a first inlet 20 and exiting through a first outlet 22. The condenser 18 includes a second inlet 72 that is connected via a suitable conduit to the vapor outlet 68 of the bag filter 66. In the condenser 18, heat is transferred from the water vapor to the coolant passing through the condenser 18 via the first inlet 20, thereby cooling and condensing the water vapor into clean, treated water. This condensed water is discharged from the condenser 18 through a second outlet 74. The water can thus be collected for any suitable use as another output product of the system 10. Any suitable coolant, such as cooling water, air or a refrigerant, can be used in the condenser 18. In one embodiment, feedwater from the source 14 is used as the coolant. In this case, raw feedwater would be routed from the source 14 to the first condenser inlet 20 and heated feedwater would exit via the first outlet 22. A fraction of the heated feedwater discharged from the condenser 18 would be pumped by the supply pump 12 to the cartridge filter 24. The remaining portion of the feedwater discharged from the condenser 18 would be returned to the source 14. Using the feedwater as the condenser coolant has the advantage of heating the feedwater before it is delivered to the first-stage evaporation chamber 78, thereby resulting in more efficient evaporation.

Residual warm air from the condensed water vapor is discharged through a third outlet 76 of the condenser 18. While this residual warm air could be simply vented to the atmosphere, it is preferably directed to the inlet of the heater 44 so as to preheat the incoming ambient air and thereby increase the overall efficiency of the system 10 by reducing the energy requirements for heating the air.

The system 10 provides a unique overall treatment process that can recover both clean water and dissolved or suspended solids in dry form. The system 10 is capable of treating high salt concentration feedwaters, produces a dry solid product with potential market value, eliminates the need to dispose of an undesirable concentrate or brine solution, and recovers close to 100 percent of the quantity of water being treated with a quality approaching that of distilled water. In instances where there is no interest in recovering the treated water (i.e., for applications in which only recovery of the dry solids is desired), the condenser 18 can be omitted and the water vapor would be discharged to the atmosphere.

The two-stage evaporation process of the present invention provides significant cost savings benefits. As discussed above, the first-stage evaporation chamber 78 operates at a much lower temperature than the second-stage evaporation chamber 26. By way example, the first-stage evaporation chamber 78 could be operated at 180° F. for partial evaporation of feedwater, and the second-stage evaporation chamber 26 could be operated at 400° F. to ensure full and rapid evaporation of the feedwater. Such conditions will typically result in about 74% of the total volume of feedwater entering the first-stage evaporation chamber 78 being evaporated in the first-stage evaporation chamber 78. This means that only about 26% of the total volume of feedwater will be supplied to the second-stage evaporation chamber 26. The portion of the feedwater that is evaporated in the first-stage evaporation chamber 78 is only heated to the lower first stage temperature; this portion of the feedwater is not supplied to the second-stage evaporation chamber 26 and is thus not heated to the higher temperature. Only the high concentration feedwater that is fed to the second-stage evaporation chamber 26 (which is only about one-fourth of the total volume of feedwater treated by the system 10) is heated to the higher temperature. Thus, the system 10 uses less energy to evaporate the feedwater than a system in which all of the feedwater was heated to a higher temperature. The fact that the second-stage evaporation chamber 26 vaporizes a high concentration feedwater does not affect the energy usage because the amount of energy needed to evaporate a given volume of water is largely independent of the salinity of the water: It takes approximately the same quantity of heat to treat one gallon of low salinity water as it does to treat one gallon of high salinity water.

Atomizer size and type, feedwater feed pressure, heated air temperature, and evaporation chamber detention time are process treatment variables that affect the performance of the system 10. One variable can impact the other. An objective is to achieve the desired treatment goals and maximum efficiency at the least cost. Low feed pressures will reduce electrical energy charges, lower heated air temperatures will reduce fuel charges but increase evaporation volume, and larger orifice diameter nozzles will allow easier solid capture and smaller solid separator units.

While specific embodiments of the present invention have been described, it will be apparent to those skilled in the art that various modifications thereto can be made without departing from the spirit and scope of the invention as defined in the appended claims.

What is claimed is:

1. A method for treating feedwater comprising:

providing a first evaporation chamber and a second evaporation chamber having an upper section and a lower section;

introducing a feedwater carrying suspended or dissolved solids into said first evaporation chamber;

causing a portion of said feedwater in said first evaporation chamber to evaporate, whereby water vapor is separated from remaining feedwater;

discharging water vapor from said first evaporation chamber;

discharging said remaining feedwater from said first evaporation chamber;

introducing a stream of hot air into said second evaporation chamber;

dispersing droplets of said remaining feedwater into said stream of hot air whereby said droplets evaporate and said solids precipitate;

collecting precipitated solids in said lower section; and discharging water vapor from said second evaporation chamber.

2. The method of claim 1 further comprising treating water vapor discharged from said first evaporation chamber and water vapor discharged from said second evaporation chamber in a cyclone separator to remove residual solids therefrom.

3. The method of claim 2 further comprising discharging precipitated solids from said cyclone separator.

4. The method of claim 2 further comprising condensing water vapor output from said cyclone separator.

5. The method of claim 1 wherein causing a portion of said feedwater in said first evaporation chamber to evaporate includes heating an interior region of said first evaporation chamber and spraying said feedwater into said heated interior region.

6. The method of claim 1 further comprising filtering said feedwater prior to introducing said feedwater into said first evaporation chamber.

7. The method of claim 1 further comprising discharging precipitated solids from said second evaporation chamber.

8. A system for treating feedwater comprising:

a first evaporation chamber having an interior region;

means for heating said interior region;

means for introducing a feedwater carrying suspended or dissolved solids into said interior region, whereby a portion of said feedwater in said first evaporation chamber evaporates such that water vapor is separated from remaining feedwater;

a second evaporation chamber having an upper section and a lower section;

means for introducing a stream of hot air into said second evaporation chamber; and at least one atomizer disposed in said upper section of said second evaporation chamber and connected to receive remaining feedwater output from said first evaporation chamber, said at least one atomizer being positioned so as to disperse droplets of said remaining feedwater into said stream of hot air whereby said droplets evaporate and said solids precipitate and fall by gravity into said lower section.

9. The system of claim 8 further comprising a cyclone separator connected to receive water vapor discharged from said first evaporation chamber and water vapor discharged from said second evaporation chamber.

10. The system of claim 9 further comprising a condenser for condensing water vapor output from said cyclone separator.

11. The system of claim 8 wherein said means for heating said interior region include a heating coil.

12. The system of claim 8 further comprising means for filtering said feedwater located upstream of said first evaporation chamber.

13. The system of claim 12 wherein said means for filtering said feedwater comprises a screen.

14. The system of claim 12 wherein said means for filtering said feedwater comprises a cartridge filter.

15. The system of claim 12 wherein said means for filtering said feedwater comprises a screen and a cartridge filter.

16. The system of claim 8 further comprising means for discharging precipitated solids from said second evaporation chamber.

17. The system of claim 8 further comprising means for discharging precipitated solids from said cyclone separator.

* * * * *